United States Patent [19]

Peterson et al.

[11] Patent Number: 5,729,285
[45] Date of Patent: Mar. 17, 1998

[54] FOCAL PLANE ARRAY INTEGRATED CIRCUIT WITH INDIVIDUAL PIXEL SIGNAL PROCESSING

[75] Inventors: Kirk D. Peterson, Plano; Dana Dudley, Dallas; Kevin N. Sweetser, Garland, all of Tex.

[73] Assignee: Texas Instruments Incorporated, Dallas, Tex.

[21] Appl. No.: 474,229

[22] Filed: Jun. 7, 1995

Related U.S. Application Data

[63] Continuation of Ser. No. 97,522, Jul. 27, 1993.

[51] Int. Cl.[6] .............................. H04N 5/33; H04N 5/335
[52] U.S. Cl. ..................... 348/162; 348/164; 348/216; 348/222; 348/241; 250/330; 250/332; 250/338.1
[58] Field of Search .................................. 348/162, 164, 348/165, 166, 216, 222, 241, 244; 250/330, 332, 338.1, 338.2, 338.3, 340, 208.1; H04N 5/335

[56] References Cited

U.S. PATENT DOCUMENTS

| | | | |
|---|---|---|---|
| 4,488,052 | 12/1984 | Zappen et al. | 250/578 |
| 4,499,497 | 2/1985 | Levine | 358/213 |
| 4,549,215 | 10/1985 | Levine | 358/213 |
| 4,617,593 | 10/1986 | Dudley | 358/113 |
| 4,902,894 | 2/1990 | Butler | 250/338.1 |
| 4,967,082 | 10/1990 | Cooke et al. | 250/338.3 |
| 5,043,820 | 8/1991 | Wyles et al. | 358/213.28 |
| 5,075,549 | 12/1991 | Pines | 250/332 |
| 5,144,133 | 9/1992 | Dudley et al. | 250/208.1 |
| 5,268,576 | 12/1993 | Dudley | 250/332 |
| 5,306,905 | 4/1994 | Guillory et al. | 250/208.1 |
| 5,349,380 | 9/1994 | Stein | 348/250 |
| 5,382,977 | 1/1995 | Kozlowski et al. | 348/300 |
| 5,446,529 | 8/1995 | Stettner | 356/4.01 |
| 5,461,425 | 10/1995 | Fowler et al. | 348/294 |

*Primary Examiner*—John K. Peng
*Assistant Examiner*—Ngoc-Yen Vu
*Attorney, Agent, or Firm*—Gerald E. Laws; C. Alan McClure; James C. Kesterson

[57] ABSTRACT

This is a monolithic infrared detector readout circuit for a capacitive sensing element 111 wherein a high gain preamplifier 115 is biased by a large bias element 113, e.g. on the order of $10^{12}$ ohms. The output of the preamplifier 115 is band-limited by a low pass single-pole filter 117 having a high value resistive element 119, e.g. on the order of $10^9$ ohms, and then is clamped by a clamp circuit 131 to a stable reference in a manner that doubles the amplitude of the signal and minimizes low frequency bias shifts and fixed pattern noise. The output of the clamp circuit 131 is buffered by buffer 123 prior to being multiplexed by row address signals. The output from a multiplex switch 125 is then applied to the column line for output to a video circuit or the like.

15 Claims, 3 Drawing Sheets

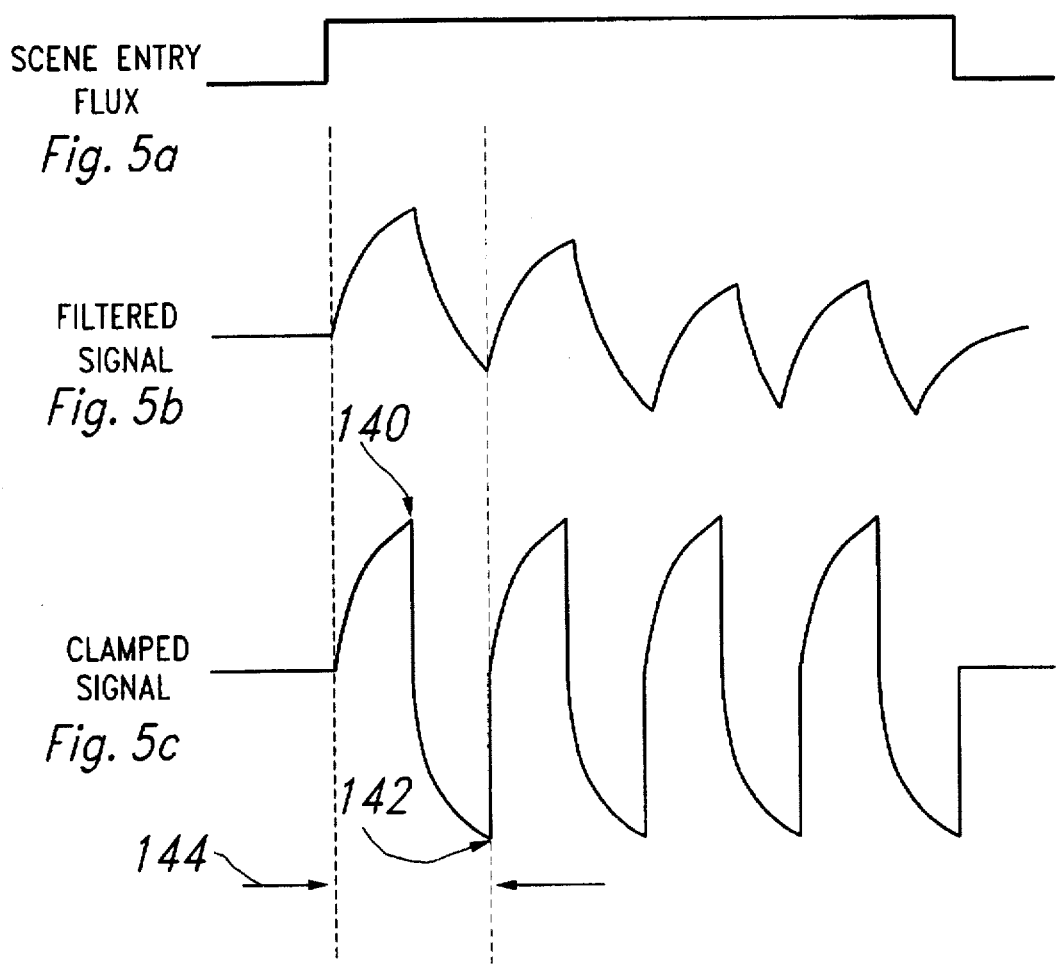

5,729,285

FOCAL PLANE ARRAY INTEGRATED CIRCUIT WITH INDIVIDUAL PIXEL SIGNAL PROCESSING

This is a continuation of application Ser. No. 08/097,522, filed Jul. 27, 1993.

BACKGROUND OF THE INVENTION

1. Field of the Invention

This invention relates to imaging systems, and more specifically to an improved imaging system that provides extensive signal processing within each pixel unit.

2. Brief Description of the Prior Art

In order to enhance the performance of infrared detector readout circuits, it is desirable to create a signal that has a high signal to noise ratio and a uniform response to input infrared energy. It is now common to use a chopper positioned in front of the detector array to create a detector signal that alternates at the frequency of the chopper. The amplitude of the signal is varied in response to the variable capacitance of the ferroelectric detector element. Since the scene that the detector is monitoring changes at a much lower rate than the chop frequency, the signal to noise ratio can be enhanced by amplifying and filtering the signal with a low pass filter, as described in U.S. Pat. No. 5,144,133.

SUMMARY OF THE INVENTION

It has now been found that the capacitive detector and the preamplifier form a high pass filter that removes some low frequency information from the signal. The presence of a high pass pole is desirable for reduction of low frequency noise, but attempting to strictly define the high pass pole value to simultaneously achieve good noise rejection and adequate signal transmission severely limits manufacturability. A reduction of signal information may produce unwanted effects in the resultant video image. Another aspect of the prior art is that the amplitude of the signal is superimposed on the initial bias point of the preamplifier in such a manner that the following amplifier and signal handling stages may be momentarily overloaded by a large signal until the bias point is reestablished.

In accordance with the present invention, the above noted deficiencies of the prior art are minimized. An advantage of the current invention is that it teaches a method for clamping the detector signal so that fixed pattern noise is minimized. Another advantage is that signal induced bias shifts are minimized so that the full dynamic range of an external frame processor can be utilized for processing scene information. A further advantage is that a circuit design is taught that minimizes the number of devices that are required to implement the detector readout circuit with the precision demonstrated.

In one embodiment, there is a detector circuit comprising a matrix of unit cells, and multiplex switches to connect each of the unit cells to a video output terminal. Each of the unit cells is comprised of a sensing element connected to a preamplifier, a clamp circuit connected to the preamplifier and a buffer connected to the clamp circuit. The buffer has an output that is connected to the multiplex switch.

In a preferred embodiment, an adjustable low pass filter is connected to an output of the preamplifier and an output of the low pass filter is connected to the clamping circuit.

One form of the invention encompasses a detector circuit wherein the clamping circuit comprises a transistor connected between a predetermined clamping voltage and the clamp circuit output terminal and a voltage storage device connected to the output terminal. The invention also encompasses a detector circuit wherein all of the clamping circuits are connected to the same predetermined clamping voltage, and/or a detector circuit wherein all of the clamping circuits are connected to a common enabling signal via appropriate buffers so that all of the clamping circuits are activated at the same time.

Another form of the invention also encompasses a detector circuit wherein a row address circuit is connected to each of the unit cells to selectively enable the output terminal of each of the unit cells to be connected to one of a plurality of column lines and a column address circuit is connected to each of the column lines via appropriate amplifiers and provides at least one video output terminal. The invention also encompasses a detector circuit wherein at least one chain of charge coupled devices (CCD) is arranged so that the output terminal of each of the unit cells is connected to one corresponding tap of the CCD chain and a multiplex circuit is connected to one end of each of the CCD chains via appropriate amplifiers and provides at least one video output terminal.

Another form of the invention also encompasses a method for processing image information within a detector circuit comprising setting a voltage on the input of a buffer to a predetermined reference voltage and then exposing a sensing element to a scene energy flux emanating from a scene so that the voltage on the buffer input is changed to a first scene voltage by an amount that is indicative of the difference in intensity of the scene energy flux and a reference energy flux, and then resetting the voltage on the buffer input to the predetermined reference voltage and exposing the sensing element to the reference energy flux so that the voltage on the input is changed to a second scene voltage by an amount that is indicative of the difference in intensity of the reference energy flux and the scene energy flux.

Another form of the invention encompasses a detector circuit wherein the buffer comprises a first MOSFET transistor whose gate is the input of the buffer a second MOSFET transistor whose drain terminal is connected to the first MOSFET transistor and whose gate terminal is connected to the input of the preamplifier.

BRIEF DESCRIPTION OF THE DRAWINGS

Other features and advantages of the present invention will become apparent by reference to the following detailed description when considered in conjunction with the accompanying drawings; in which:

FIG. 5a is a timing diagram of representative energy flux emanating from one pixel area of a scene;

FIG. 5b is a timing diagram of the unit cell output without a clamping circuit; and FIG. 5c is a timing diagram of the unit cell output with the present invention.

DESCRIPTION OF THE PREFERRED EMBODIMENT

In a typical detector system, the infrared energy emanating from a scene is focused on a focal plane array detector using a lens. Periodically, the focused image is interrupted by a shutter that blocks the scene from the focal plane array detector. Each unit cell of the detector creates a signal that is proportional to the temperature of one pixel of the scene that is focused on the focal plane array detector. The output of the detector is a composite signal of all of the signals from each unit cell and is sent to a video system that includes a video processor for further processing and typically for display on a video monitor. The shutter is operated at the frame rate of the video system so that the focal plane array detector is exposed to the scene once for each frame of the video system, this rate is typically 30 Hz. The lens, shutter, video system, video processor and video monitor are generally well understood by those skilled in the art and will not be described herein.

Figure 1:
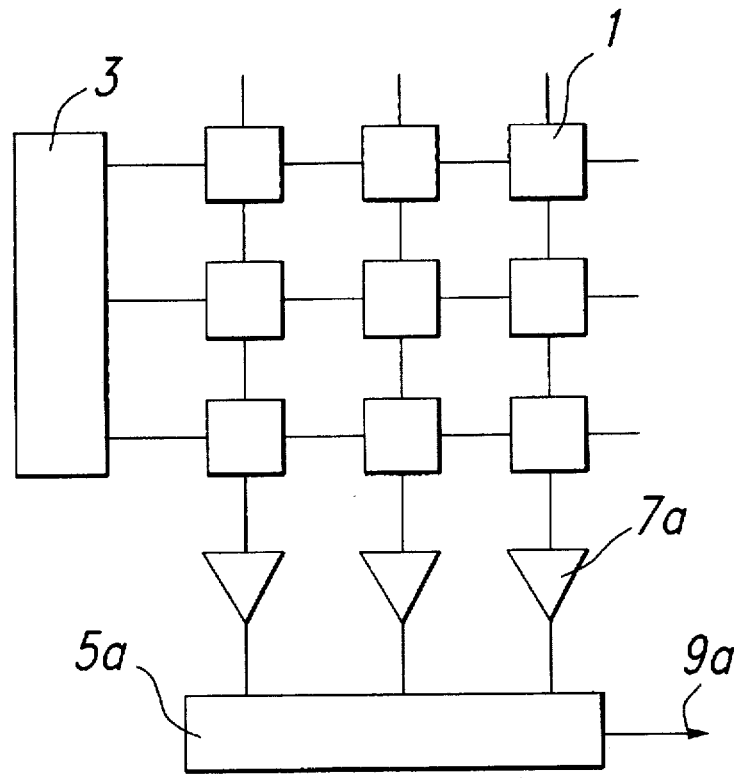
FIG. 1 is a block diagram of a focal plane array detector with row and column readout means.
Figure 2:
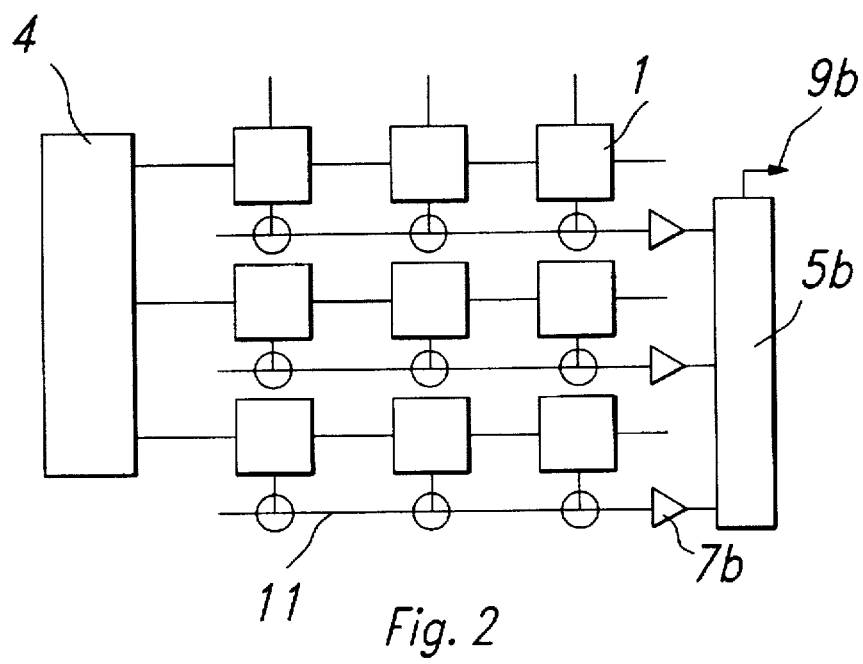
FIG. 2 is a block diagram of a focal plane array detector with CCD readout means.

Referring first to FIG. 1, there is shown a focal plane detector array with row and column readout means wherein each unit cell 1 biases, amplifies, band-limits and clamps the signals generated by each pixel and the unit cell outputs are interrogated via the row address circuit 3 and column multiplex circuit 5a via amplifiers 7a and transferred to the video output 9a. Referring to FIG. 2, there is shown an alternate embodiment of a focal plane array detector with CCD readout means wherein each unit cell 1 biases, amplifies, band-limits and clamps the signals generated by each pixel and the unit cell outputs are interrogated via the row sample circuit 4 and connected to taps on a CCD chain 11 and then combined via amplifiers 7b and multiplex circuit 5b and then transferred to the video output 9b.

Unit cell 1 is interrogated twice during each frame period, where the frame period is equal to the inverse of the chopper frequency; once after the sensor has been exposed to the scene and the sensor output has reached an amplitude that is representative of the temperature of the image pixel corresponding to that sensor and a second time after the scene has been either blocked or optically defocused by the chopper and the sensor output has reached a reference amplitude that is representative of the apparent temperature of the chopper. An external video processor can then subtract the second amplitude from the first amplitude to get a value that is representative of the difference in temperature of the scene and the ambient. Table A summarizes elements of FIGS. 1, 2, and 3.

TABLE A

| Element | function |
| --- | --- |
| 1 | unit cell |
| 3 | row address circuit |
| 4 | row sample circuit |
| 5a, 5b | column multiplex circuit |
| 7a, 7b | amplifier |
| 9a, 9b | video output |
| 11 | CCD chain |
| 111 | sensing element |
| 113 | bias element |
| 115 | preamplifier |
| 117 | low pass filter |
| 119 | resistive element |
| 121 | capacitor |
| 123 | buffer |
| 125 | multiplex switch |
| 131 | clamp circuit |
| 133 | clamp capacitor |
| 135 | clamp switch |

Figure 3:
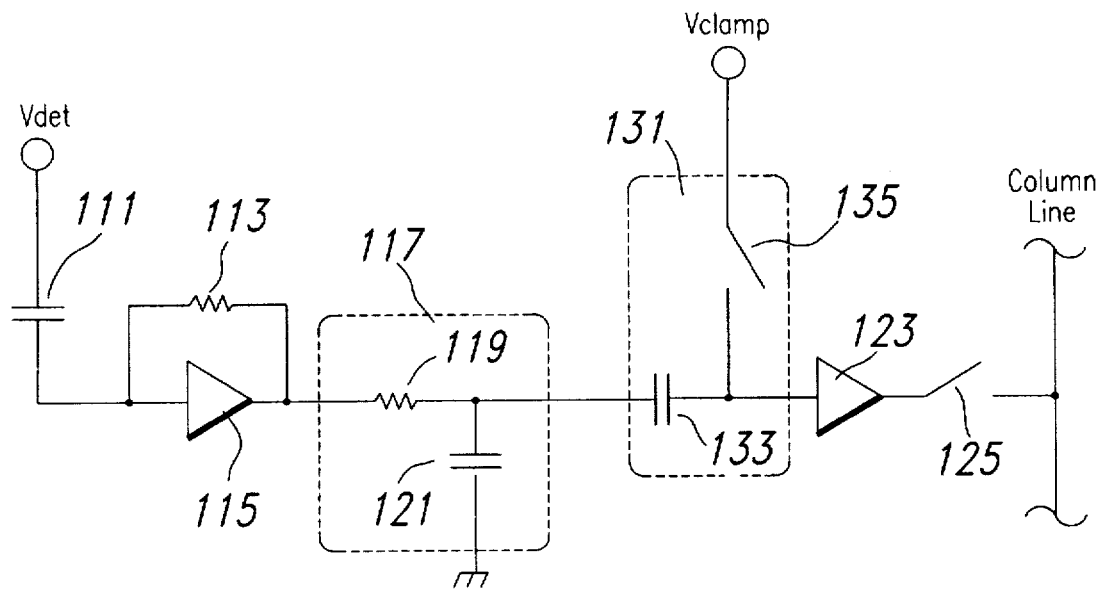
FIG. 3 is a block diagram of a unit cell in accordance with the present invention.

Each unit cell 1 is shown in detail in FIG. 3. The unit cell corresponds to a pixel of a focal plane array and includes a ferroelectric sensing element 111 which is depicted as a capacitor wherein the dielectric constant of the dielectric, and thus the voltage thereacross, changes with change in temperature thereof. Such sensing elements are well known in the art, and examples of such ferroelectric materials include barium strontium titanate, lithium tantalate and triglycine sulfate. The sensor, which absorbs infrared energy and turns it into thermal energy, is also known as a thermal detector or a pyroelectric detector. Typically, the sensor will be operated near its Curie temperature and will be biased with a predetermined voltage $V_{DET}$ that enhances the pyroelectric effect; however, the mode of operation of the sensor is not an important aspect of this patent. The voltage change across the sensing element is very small, e.g. being in the range of microvolts to millivolts and it is desirable to amplify this signal in order to minimize the effect of noise that may get added to the signal in later phases of the signal processing. A circuit to do this is described in prior art U.S. Pat. No. 5,144,133. A preamplifier 115 with a feedback bias element 113 amplifies the signal to a range of several hundred millivolts. The bias element 113 is placed in the feedback loop of the preamplifier 115 in order to provide high gain and to control the DC biasing of the preamplifier 115 so that the preamplifier 115 is not in saturation. Noise from the bias element 113 is minimized by making the resistance value of the bias element large so that the 1/f noise of the bias element 113 is well below the chop frequency, typically 30 Hz. Therefore, the noise can be reduced by high pass filtering. It is therefore desirable to obtain a resistance in bias element 113 of about $10^{12}$ ohms. The 1/f noise of the sensor and the preamplifier can also be reduced by high pass filtering. A high pass filter is formed by the intrinsic capacitance of sensor 111 and the input impedance of preamplifier 115. Further filtering is provided by clamp circuit 131, which will be described later.

It is also desirable to roll off the high frequency noise associated with both the preamplifier 115 and the detector or sensing element 111, a low pass filter being required for this function. This is accomplished as taught in prior art with the low pass filter 117 composed of resistive element 119 and capacitor 121 wherein the resistive element 119 has a resistance of about $10^9$ ohms and the capacitor 121 has a capacitance of several tenths of picofarads resulting in a corner frequency of about 150 Hz.

A feature of the present invention is now used to maintain the reference level of the amplified signal at a constant voltage level. Referring to FIG. 5, a frame period is shown as time period 144. FIG. 5a represents energy flux emanating from one pixel area of a scene that falls on one unit cell. For this description, the scene energy flux changes from a first value to a second value for several frame periods and then returns to the first value. In the prior art, a large step increase in the infrared energy flux to the sensor caused the bias point of the preamplifier to shift by an amount equal to approximately more than one half the signal magnitude. This shift was restored by the action of the feedback bias element similar to element 113 but this bias point appeared in the output signal causing the range of the output signal to be larger than the output range necessary to represent the thermal signal. This lost dynamic range seriously degraded system performance. This undesirable effect is shown in FIG. 5b. The present invention adds a clamp circuit 131 which may be activated twice each frame period; once after unit cell 1 has been exposed to the scene and once after unit cell 1 has been exposed to the chopper. In addition to reducing lost dynamic range, the clamping circuit acts to double the signal amplitude further enhancing the signal to noise ratio.

The clamping sequence preferably comprises the following steps which are performed sequentially in time.

A. Clamp switch 135 is momentarily closed and the input to buffer 123 is charged to a predetermined clamp voltage, $V_{clamp}$, while the sensing element 111 is exposed to a reference energy flux, which typically emanates from the chopper;

B. Clamp switch 135 is opened and the chopper then exposes unit cell 1 to the scene for a period of time approximately equal to one half of the frame period. In response to energy flux from the scene, the voltage across sensing element 111 changes from a value indicative of the apparent temperature of the chopper to a value indicative of the intensity of the infrared energy focused on sensing element 111. The voltage change of the sensing element 111 is amplified and filtered as described previously. The amplitude of the filtered signal passes through clamp capacitor 133 and changes the amplitude of the voltage on the input of buffer 123 by an amount indicative of the difference in temperature between the apparent chopper temperature and the scene temperature. Buffer 123 buffers the signal on its input and outputs a buffered scene signal on the unit cell 1 output terminal.

C. At the end of the scene exposure period, indicated as time 140 in FIG. 5c, the multiplex switch 125 is closed momentarily and a first buffered scene signal is connected to a column line and is then sent to an external video system for further processing.

D. After multiplex switch 125 is opened, clamp switch 135 is again closed momentarily to reset the voltage amplitude on the input of buffer 123 to $V_{clamp}$.

E. The chopper is positioned so that it now block unit cell 1 from radiation from the scene for a blocking period approximately equal to one half of the frame period.

F. In response to the energy flux emanating from the chopper, the voltage across sensing element 111 changes from the value indicative of the scene temperature back to a value indicative of the apparent temperature of the chopper. The amplitude of this change passes through clamp capacitor 133 and changes the amplitude of the voltage on the input to buffer 123 by an amount indicative of the difference in temperature between the scene temperature and the apparent temperature of the chopper. Buffer 123 buffers the signal on its input and outputs a buffered signal on the unit cell 1 output terminal.

G. At the end of the blocking period, time 142 in FIG. 5c, the multiplex switch 125 is again closed momentarily and a second buffered scene signal is connected to a column line and is then sent to an external video system for further processing.

This sequence is repeated for each frame period.

The result of the clamp sequence is that the peak to peak signal amplitude that is input to buffer 123 is approximately twice the peak to peak amplitude of the filtered signal and it is always centered on $V_{clamp}$. An important feature of this patent is that since the output signal is always centered around a predetermined reference voltage, as depicted by FIG. 5c, the full dynamic range of the external video system can be used for signal processing the composite signal provided at video output 9.

Figure 4:
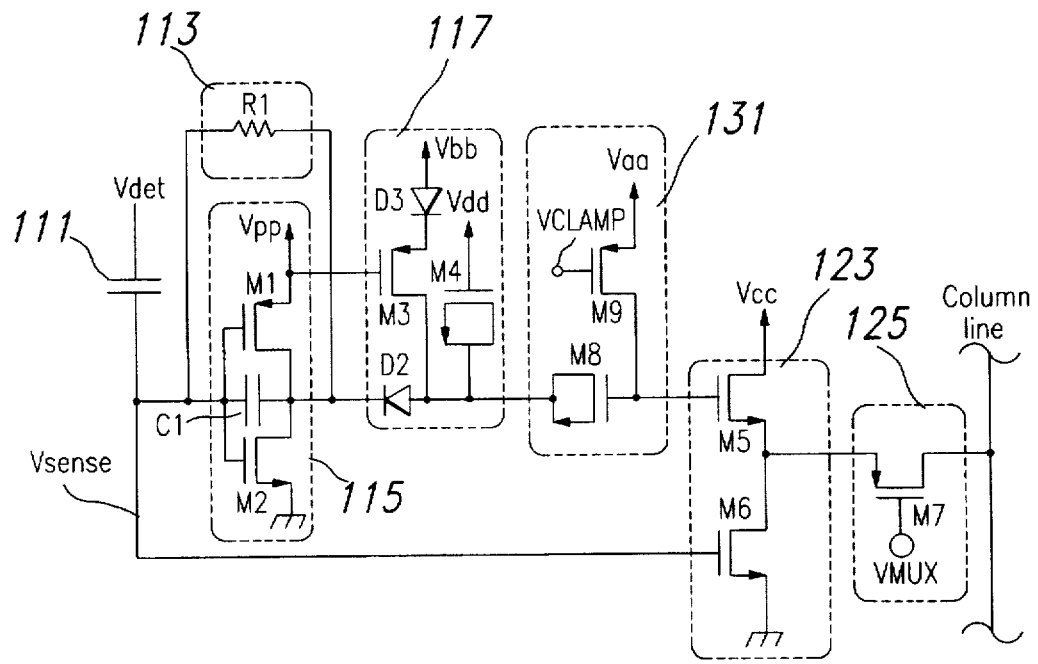
FIG. 4 is a circuit diagram of the unit cell of FIG. 3.

Referring to FIG. 4 and to Table B, the operation of the detector circuit will be explained. The only input signal to the detector circuit is provided by sensing element 111 which is used with a chop system (not shown) wherein the input infrared energy to the sensor is time dependent due to the chopping of the signal, even when the scene being detected is constant. The chopping causes the voltage signal created by sensing element 111 to appear typically as an approximate 30 Hz triangular wave; however, the chopping frequency may be reduced for some applications or increased for other applications. This description will assume a chopper frequency of 30 Hz.

TABLE B

| Element | function | Specific embodiment | Alternate examples |
|---|---|---|---|
| 111 | sensing element | $(Ba_xSr_y)TiO_3$ (where: $x + y = 1$) | lithium tantalate, triglycine sulfate |
| 113 | Bias element | $10^{12}$ ohms, poly Si R1 | forward biased diode |
| C1 | Input capacitor | M1, M2 intrinsic capacitance | parallel plate capacitor |
| 115 | preamplifier | MOS transistors M1, M2 | |
| 117 | low pass filter | D2 = $10^9$ Ohm M4 = ⅓ pf 3 db = 120 Hz | poly Si resistor 3 db = 40–2000 Hz |
| D3, M3 | Current source | 8 pA | poly Si resistor |
| 123 | Buffer | MOS transistors M5, M6 | |
| 125 | multiplex switch | MOS transistor M7 | |
| 133 | clamp capacitor | MOS transistor M8 | parallel plate capacitor |
| 135 | clamp switch | MOS transistor M9 | |

The sensing element 111 has a small leakage current of about $10^{-13}$ to about $10^{-15}$ amperes which trickles through resistor R1 of FIG. 4, providing the function of bias dement 113. The resistance of R1 should be large to minimize preamplifier gain loss, but should be small enough to absorb the leakage current. The value of R1 is also important in positioning the high pass filter pole to attenuate noise without significant loss of signal. A resistance in the range of $10^{12}$ ohms has been found to be acceptable. To obtain the bias resistance of about $10^{12}$ ohms and the low pass filter resistance of $10^9$ ohms, diodes may used, as described in prior art. Transistors M1 and M2 form a CMOS preamplifier corresponding to preamplifier 115 of FIG. 3. Capacitor C1 is preferably the intrinsic capacitance of M1 and M2 and forms a high pass filter in combination with R1. Capacitor C1 can also be used to limit the gain of preamplifier 115. The low pass filter 117 is composed of diode D2 which represents the resistive element 119 of FIG. 3 and transistor M4 which represents the capacitor element 121 of FIG. 3. The bandwidth of the low pass filter 117 must be controlled, so the amount of current passing through the diode D2 is of concern. In order to obtain about $10^9$ ohms of resistance at diode D2, a current of about $10^{-11}$ amperes is passed through diode D2. This current is determined by the voltage across diode D3 and MOSFET M3, this voltage being controlled by $V_{bb}$, wherein $V_{bb}$ can be varied. Therefore, diode D3 and transistor M3 operate as a current generating circuit and control the current through diode D2. Since the effective resistance of D2 is dependant on the current through D2, changing the value of $V_{bb}$ will change the corner frequency of the low pass filter 117. In a preferred embodiment, the corner frequency is about 150 Hz, but other embodiments may use corner frequencies ranging from 40 Hz to several kHz.

Transistor M8 is a MOSFET which operates as the clamp capacitor 133. Transistor M9 is the clamp switch 135 and charges the input of buffer 123 to the value of $V_{aa}$. $V_{aa}$ may be the same for all unit cells 1, or it may be different to allow for adjustments to minimize fixed pattern noise. In a preferred embodiment, $V_{aa}$ is connected to $V_{cc}$; however, other sources for $V_{aa}$ may be used in other embodiments of this invention. Transistor M9 is controlled by VCLMP. The clamp circuits of all unit cells 1 may be activated at the same time by a common VCLMP signal, or different unit cells 1 may be activated at different times. In a preferred embodiment, all of the unit cells 1 in a row will be clamped at the same time, but each row will be clamped at a different time. The VMUX signal from an adjacent row is used in a preferred embodiment for VCLMP so that while one row is being connected to the column lines for readout, the adjacent row is being clamped.

Transistors M5 and M6 are the buffer 123 of FIG. 3. A feature of the current patent is that the signal from sensing element 111 can be used to bias transistor M6 and thus eliminate the need for a separate source of stable bias voltage. $V_{sense}$ is modulated by only a few millivolts of detector signal so it is stable enough to bias transistor M6 as a current source. Transistor M7 is the multiplex switch 125 of FIG. 3 through which the output to the column line is provided. Transistor M7 of FIG. 4 is controlled by row enable signal VMUX that is generated by the row address circuit as shown in FIG. 1 or the row sample circuit as shown in FIG. 2.

All of the transistors are preferably MOSFETs with a complementary pair desired for the preamplifier 115 to obtain the high gain. The diode D2 should be forward biased in order to provide good control of the resistance values thereof.

The diodes D2 and D3 and transistor M3, which are utilized herein to provide very high resistance in a monolithic circuit can be replaced by very lightly doped polysilicon which is substantially intrinsic.

Though the invention has been described with respect to specific preferred embodiments thereof, many variations and modifications will immediately become apparent to those skilled in the art. As used herein, the terms "connected" and "connection" mean electrically connected, including where additional elements may be in the electrical connection path. It is therefore the intention that the appended claims be interpreted as broadly as possible in view of the prior art to include all such variations and modifications.

What is claimed is:

1. A detector circuit comprising:
   a matrix of unit cells, each of the unit cells having a cell output terminal;
   a multiplex switch connected between the output terminal of each unit cell and a video output terminal;
   each of the unit cells comprising physically therein:
      a capacitive sensing element;
      a preamplifier having an input connected to the sensing element, and an output;
      a clamp circuit having an input connected to the preamplifier output, and an output;
      a buffer having an input connected to the clamp circuit output, and an output, the buffer output being connected to the cell output terminal;
   wherein the buffer further comprises:
   a first MOSFET transistor whose gate is the input of the buffer; and
   a second MOSFET transistor whose drain terminal is connected to the first MOSFET transistor and whose gate terminal is connected to the input of the preamplifier.

2. The detector circuit of claim 1, in which:
   a low pass filter is connected between the preamplifier and the input of the clamp circuit.

3. The detector circuit of claim 1, wherein the clamp circuit comprises:

a transistor connected between a predetermined clamp voltage and the output terminal of the clamp circuit with the control node of the transistor connected to an enabling signal; and
a voltage storage device connected to the output terminal.

4. The detector circuit of claim 1, wherein the clamp circuit comprises:
   a capacitor having one terminal serving as the input to the clamp circuit and the other terminal of the capacitor serving as the output terminal of the clamp circuit; and
   a transistor connected between a predetermined clamp voltage and the output terminal of the clamp circuit with the control node of the transistor connected to an enabling signal.

5. The detector circuit of claim 1, wherein the multiplex switch comprises:
   a row address circuit which is connected to each of the unit cells to selectively enable the cell output terminal of each of the unit cells to be connected to one of a plurality of column lines; and
   a column address circuit which is connected to each of the column lines via appropriate amplifiers and provides at least one video output terminal.

6. The detector circuit of claim 1, wherein the multiplex switch comprises:
   at least one chain of charge coupled devices (CCD) that is arranged so that the cell output terminal of each of the unit cells is connected to one corresponding tap of the CCD chain; and
   a multiplex circuit that is connected to one end of each of the CCD chains via appropriate amplifiers and which provides at least one video output terminal.

7. A method for simultaneously processing image information within a detector circuit, the detector circuit having an array of unit cells, comprising:
   simultaneously clamping a voltage on an input of a buffer of each of the unit cells to a predetermined reference voltage while exposing a sensing element of each of the unit cells to a reference energy flux;
   exposing the sensing element of each of the unit cells to a scene energy flux emanating from a scene so that the voltage on the buffer input of each of the unit cells is changed to a first scene voltage by an amount that is indicative of the difference in intensity of the scene energy flux and the reference energy flux;
   connecting a first buffered scene voltage from each of the unit cells to a video output terminal;
   simultaneously re-clamping the voltage on the buffer input of each of the unit cells to the predetermined reference voltage;
   exposing the sensing element of each of the unit cells to the reference energy flux so that the voltage on the buffer input of each of the unit cells is changed to a second scene voltage by an amount that is indicative of the difference in intensity of the reference energy flux and the scene energy flux; and
   connecting a second buffered scene voltage from each of the unit cells to the video output terminal so that a resulting video output signal has an amplitude that is approximately twice the magnitude of the first buffered scene voltage of each of the unit cells and a noise component that is approximately the same as in the first buffered scene voltage.

8. The method of claim 7, in which the step of exposing the sensing element to a scene energy flux further comprises:

simultaneously preamplifying a signal from the sensing element of each of the unit cells so that the voltage on the buffer input of each of the unit cells is changed to a first scene voltage that is larger.

9. The method of claim 7, in which the step of exposing the sensing element to a scene energy flux further comprises:

simultaneously filtering a signal from the sensing element of each of the unit cells by a low pass filter before it is sent to the buffer of each of the unit cells.

10. The method of claim 7, in which:

a signal from the sensing element is preamplified and then filtered by a low pass filter before it is sent to the buffer.

11. The method of claim 8 in which:

the signal from the sensing element is also used as a stable signal to bias the buffer.

12. A method for processing image information from a detector circuit comprising:

(a) creating a plurality of amplitude modulated signals whose frequency is in the range of approximately 20 to 200 Hz by periodically exposing an array of sensing elements to focused energy emanating from a scene so that the amplitude of the signals is proportional to the temperature of each pixel of the scene; then (b) amplifying the amplitude modulated signals with a plurality of preamplifiers; then (c) filtering each of the amplified signals with a plurality of low pass filters; then (d) clamping each of the filtered signals to a known DC level in order to remove unwanted DC bias shifts by periodically clamping a plurality of nodes that are coupled to the filtered signals to a time-constant voltage source in order to create clamped signals whose amplitudes are approximately twice the amplitude of the amplified signals and centered around a predetermined bias point;

(e) buffering the clamped signals with a plurality of buffers (f) creating a video output signal by sampling each the buffered signals at points in time to obtain an approximate maximum amplitude and an approximate minimum amplitude of each pixel.

13. A method for processing image information from a detector circuit comprising:

(a) providing a detector circuit having an array of unit cells;

(b) creating an amplitude modulated signal within each of the unit cells whose frequency is in the range of approximately 20 to 200 Hz by periodically exposing a sensing element within the trait cell to focused energy emanating from a scene so that the amplitude of the signal is proportional to the temperature of a pixel of the scene;

(c) amplifying the amplitude modulated signal with a preamplifier within each unit cell;

(d) filtering the amplified signal with a low pass filter within each unit cell;

(e) increasing the signal to noise ratio of the amplified signal within each unit cell by periodically clamping a node that is coupled to the filtered signal to a time-constant voltage source in order to create a clamped signal whose amplitude is approximately twice the amplitude of the amplified signal and centered around a predetermined bias point, but such that a noise portion of the signal remains approximately constant;

(f) buffering the clamped signal with a buffer within each unit cell; and (g) creating a detector circuit output signal by sampling the buffered signal from each unit cell at points in time to obtain an approximate maximum amplitude and an approximate minimum amplitude of each unit cell signal.

14. A detector circuit comprising:

a matrix of unit cells, each of the unit cells having a cell output terminal;

a multiplex switch connected between the output terminal of each unit cell and a video output terminal;

each of the unit cells comprising physically therein:

a sensing element;

a preamplifier having an input connected to the sensing element, and an output;

a clamp circuit having an input connected to the preamplifier output, and an output;

a buffer having an input connected to the clamp circuit output, and an output, the buffer output being connected to the cell output terminal;

wherein the buffer further comprises:

a first MOSFET transistor whose gate is the input of the buffer; and a second MOSFET transistor whose drain terminal is connected to the first MOSFET transistor and whose gate terminal is connected to the input of the preamplifier.

15. An imaging system having a chopper positioned in front of a detector circuit such that focused radiation is alternately blocked and applied to the detector circuit once each frame period, the detector circuit comprising:

a matrix of unit cells, each of the unit cells having a cell output terminal;

a multiplex switch connected between the output terminal of each unit cell and a video output terminal;

each of the unit cells comprising physically therein:

a sensing element;

a preamplifier having an input connected to the sensing element, and an output;

a clamp circuit having an input connected to the preamplifier output, and an output;

a buffer having an input connected to the clamp circuit output, and an output, the buffer output being connected to the cell output terminal; and control circuitry connected to each unit cell to activate the clamp in each unit cell twice during each frame period.

* * * * *